G. E. COX.
APPARATUS FOR IMPROVING THE GRADE OF CALCIUM CYANAMID.
APPLICATION FILED AUG. 20, 1918.
1,331,742.
Patented Feb. 24, 1920.
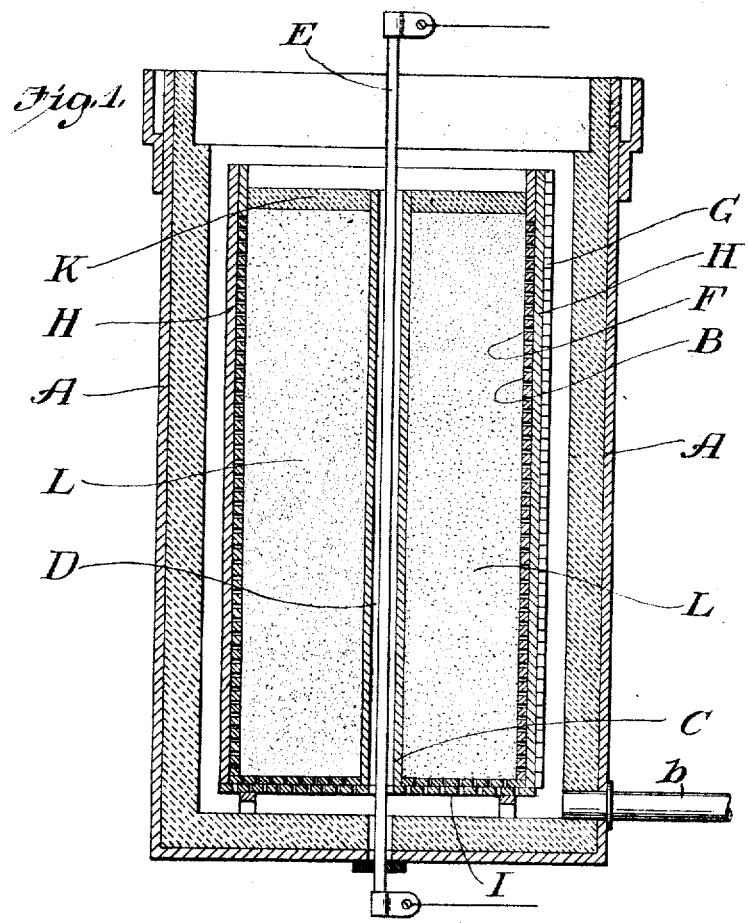
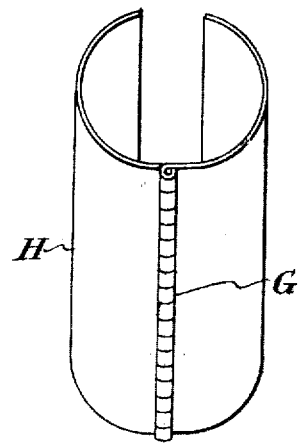
Inventor
G. E. Cox By
[signature]
Attorney

UNITED STATES PATENT OFFICE.

GEORGE E. COX, OF NIAGARA FALLS, NEW YORK, ASSIGNOR TO AMERICAN CYANAMID CO., OF NEW YORK, N. Y., A CORPORATION OF MAINE.

APPARATUS FOR IMPROVING THE GRADE OF CALCIUM CYANAMID.

1,331,742.   Specification of Letters Patent.   Patented Feb. 24, 1920.

Application filed August 20, 1918. Serial No. 250,757.

*To all whom it may concern:*

Be it known that I, GEORGE E. COX, a citizen of the United States, residing at Niagara Falls, in the county of Niagara and State of New York, have invented certain new and useful Improvements in Apparatus for Improving the Grade of Calcium Cyanamid; and I do hereby declare the following to be a full, clear, and exact description of the invention, such as will enable others skilled in the art to which it appertains to make and use the same.

This invention relates to an apparatus for improving the grade and reducing the consumption of raw materials in the manufacture of commercial calcium cyanamid and has for its object to accomplish these results in a simple and effective manner.

To these ends the invention consists in the novel construction of parts constituting the apparatus, all as will be more fully hereinafter disclosed and particularly pointed out in the claim.

Referring to the accompanying drawings forming a part of this specification, Figure 1 is a diagrammatic illustration of one form of construction, suitable for carrying out the invention; and Fig. 2 is a view showing the collapsible retainer removed from the oven.

In order that the precise apparatus may be the more clearly understood it is said:

I am familiar with the apparatus for producing calcium cyanamid disclosed in U. S. Patent #999,071, entitled Apparatus for producing calcium cyanamid, granted to Frank S. Washburn, and also with the disclosure of U. S. Patent #1,103,060, method and means for fixing nitrogen, granted to W. S. Landis. In the first mentioned patent a foraminous vessel is provided for holding the carbid which vessel is perforated, and to prevent the finely ground carbid from passing through the perforations, the said vessel is lined with a combustible material, or in conjunction with the foraminous vessel a suitable screen of wire cloth is used to prevent the sifting of the carbid. This said process also provides for using a foraminous vessel made wholly of wire screen cloth which may be used in conjunction with a combustible material. But a disadvantage of this said process lies in the fact that the foraminous vessel being used to handle or transport its load of carbid, before nitrification, as well as the finished lime nitrogen, after the reaction is completed, must be made of metal of a material weight and strength and therefore, it is more or less costly to construct, as well as to handle.

Further, it is subjected to a high temperature for a long period of time, and its deterioration is, therefore, quite costly. It is largely to avoid this deterioration and its consequent high cost of replacement that I have developed the apparatus to be described below.

In the second process referred to above, a similar metal perforated vessel, lined with a porous or textile fabric, is used for containing the carbid. This is open to the same objections as those above stated, in that a vessel of considerable weight and strength must be provided for transporting the carbid and the deterioration of this vessel is quite considerable.

With this purpose of entirely eliminating the expensive container, I have now developed a means whereby I can eliminate the use of the expensive metal containing vessel and at the same time obtain a better utilization of the raw materials as well as a higher grade product, at a materially lower cost.

In this invention I provide the regular form of cyanamid oven "A" common in the industry. Into this oven, I place a suitable hinged metallic form or temporary container "H" so constructed with hinges "G" that it can be readily inserted and withdrawn from the oven without disturbing in any way any carbid material that may be charged into the envelop inclosed by the same. Into this hinged collapsible form "H" I place a liner or envelop "B" of ordinary fairly tough, or strong paper, commonly known as Manila paper, or a similar material. I also insert a suitable tube "C" made of similar paper axially through the center of the envelop or larger tube for the purpose of providing a space for the later insertion of the electrical heating element. I then charge this empty paper container or envelop "B" according to the process described in my said copending application, or in any suitable manner, while located inside the oven, or furnace "A" with finely ground calcium carbid "L" and while the said temporary or collapsible container "H" surrounds the same, and thus bears the strain incident to the charging operation.

After the paper tube or combustible container "B" has been charged with a suitable quantity of calcium carbid, I then remove the said collapsible form "H" which supported it during the filling operation, and I then have my charge of carbid wholly supported in the furnace by the plate "I", the envelop or tube of comparatively thin and light paper "B", and provided with a central passage "D" for the insertion of the heating element "E." I may then cover the top surface of the carbid with a suitable protecting slab "K" of insulating material.

When this oven is thus charged with calcium carbid, I feed nitrogen through the pipe $b$ to the same in the usual manner, as through the tube 6, and start the heating of the resistor for attaining the desired nitrification. When nitrification is complete, the paper tubes have burned away, and I have remaining in the furnace a solid block of calcium cyanamid with a hole through its middle where the heating element has been inserted. By means of suitable tongs, I remove this block and treat the same as in the regular procedure for the manufacture of calcium cyanamid.

I have also found that it is of material benefit to perforate the envelop, or paper container, with very fine perforations illustrated at "F", and of such a size that it will substantially retain its charge of finely ground carbid without sifting and at the same time will permit nitrogen to pass through the perforations.

By the employment of this apparatus it will now be seen I avoid the use of the heavy metallic container heretofore used, with its undesirable deterioration, I avoid the difficulty of discharging the metallic container of its content of lump cyanamid, which is a very material item of expense, for in use the metallic containers become dented and do not discharge readily, or the mass of cyanamid works into the perforations of the same, and thus hinder the discharge. I also obtain much better results in the nitrification because in the absence of the heavy metal container with its considerable heat capacity, the same quantity of heat is not taken from the surface of the mass of carbid during reaction, and therefore, I produce a somewhat higher fixation than when the metal container is employed. The slab "K" prevents access of the gases present to the top of the carbid "L", and improves the efficiency of the operation.

It is evident that this apparatus and procedure can be modified by those skilled in the art without departing from the spirit of the invention, and therefore, I do not wish to be limited to the above disclosure except as may be required by the claim.

What I claim is:—

In a nitrifying apparatus the combination of a combustible container adapted to hold finely divided calcium carbid; a hollow central core for said container; and a hinged outer form for holding said container, substantially as described.

In testimony whereof I affix my signature, in presence of two witnesses.

GEORGE E. COX.

Witnesses:
G. A. HENDSIE,
W. S. LANDIS.